(12) United States Patent
Liao

(10) Patent No.: US 9,796,130 B1
(45) Date of Patent: Oct. 24, 2017

(54) THREE-DIMENSIONAL PRINTER DEVICE

(71) Applicants: XYZPRINTING, INC., New Taipei (TW); KINPO ELECTRONICS, INC., New Taipei (TW)

(72) Inventor: Chia-Wu Liao, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 0 days.

(21) Appl. No.: 15/189,276

(22) Filed: Jun. 22, 2016

(30) Foreign Application Priority Data

Apr. 14, 2016 (CN) .......................... 2016 1 0229718

(51) Int. Cl.
| | |
|---|---|
| *B29C 64/357* | (2017.01) |
| *B33Y 30/00* | (2015.01) |
| *B33Y 40/00* | (2015.01) |
| *B33Y 50/02* | (2015.01) |
| *B29C 64/35* | (2017.01) |
| *B29K 103/00* | (2006.01) |
| *B29K 105/00* | (2006.01) |

(Continued)

(52) U.S. Cl.
CPC ............ *B29C 64/357* (2017.08); *B29C 64/35* (2017.08); *B33Y 30/00* (2014.12); *B33Y 40/00* (2014.12); *B33Y 50/02* (2014.12); *B29C 64/165* (2017.08); *B29C 64/386* (2017.08); *B29K 2103/00* (2013.01); *B29K 2105/251* (2013.01)

(58) Field of Classification Search
CPC . B29C 67/00; B29C 67/0081; B29C 67/0088; B29C 67/0092; B29C 67/0096; B29C 64/00; B29C 64/153; B29C 64/165; B29C 64/35; B29C 64/357; B29C 64/386; B33Y 30/00; B33Y 99/00; B33Y 40/00; B33Y 50/02; B29K 2103/00; B29K 2105/251; B23F 3/008; B23F 3/10; B23F 3/1055–3/1059; B28B 1/001
USPC .................................................... 425/162, 78
See application file for complete search history.

(56) References Cited

U.S. PATENT DOCUMENTS 3,540,617 A * 11/1970 Iorio ..................... B65F 1/1607
220/254.2
8,523,554 B2 * 9/2013 Tung ................... B29C 67/0081
222/233

(Continued)

*Primary Examiner* — Sedef Ayalp
(74) *Attorney, Agent, or Firm* — Chun-Ming Shih; HDLS IPR Services

(57) ABSTRACT

A three-dimensional printer device includes a supplying apparatus, a formation table, a recycling trough, a distribution apparatus, a power collection cover, and a control unit. The supplying apparatus is provided to contain the powder material. The formation table has a horizontal surface, and one side of the horizontal surface is disposed adjacent to the supplying apparatus. The recycling trough has an opening, the opening is disposed at the other side of the horizontal surface opposite to the supplying apparatus. The distribution apparatus includes a roller; the roller is movable across the horizontal surface between the supplying apparatus and the recycling trough, so that the powder material inside the supplying apparatus can be distributed onto the horizontal surface. The powder collection cover covers the roller. The control unit is electrically connected to the distribution apparatus and controls the roller to move between the supplying apparatus and the recycling trough.

19 Claims, 9 Drawing Sheets

(51) Int. Cl.
 *B29C 64/165* (2017.01)
 *B29C 64/386* (2017.01)

(56) References Cited

U.S. PATENT DOCUMENTS

| | | | |
|---|---|---|---|
| 9,315,308 B2 * | 4/2016 | Audet | A47L 13/52 |
| 2002/0105114 A1 * | 8/2002 | Kubo | B29C 67/0077 |
| | | | 264/497 |
| 2005/0225007 A1 * | 10/2005 | Lai | B29C 67/0081 |
| | | | 264/308 |
| 2009/0011066 A1 * | 1/2009 | Davidson | B29C 41/12 |
| | | | 425/215 |
| 2010/0247703 A1 * | 9/2010 | Shi | B29C 67/0081 |
| | | | 425/375 |
| 2015/0165679 A1 * | 6/2015 | Goto | B29C 67/0081 |
| | | | 264/308 |

* cited by examiner

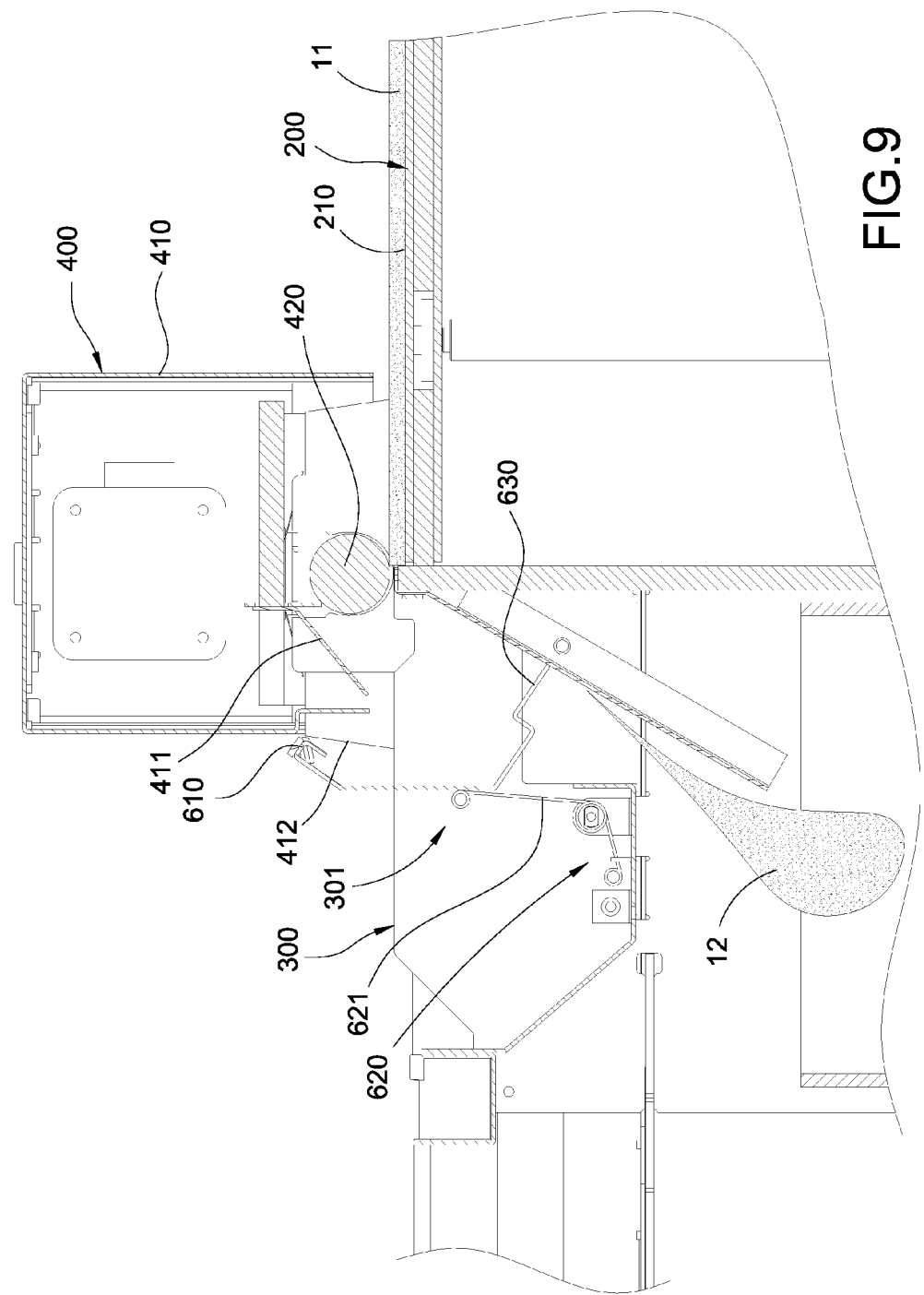

THREE-DIMENSIONAL PRINTER DEVICE

BACKGROUND OF THE INVENTION

Technical Field

The present invention relates to a three-dimensional printer device and, in particular, to a three-dimensional printer device with a dust-escape prevention design.

Description of Prior Art

There are various three-dimensional (3D) printer devices which can print 3D objects by means of different formation methods. The present invention relates to a three-dimensional printer device which forms objects via accumulation by means of curing a flat-disposed powder material. Normally, an adhesive solution is sprayed onto the flat-disposed powder material to cure the same. Such three-dimensional printer devices have a defect that the powder material may escape during the process of distributing the powder material, and if the escaped powder material is attached to the adhesive solution at an outlet of the adhesive nozzle, the escaped powder material at this place cures and blocks the adhesive nozzle.

Accordingly, the inventor made various studies to solve the defect mentioned above, on the basis of which the present invention is accomplished.

SUMMARY OF THE INVENTION

The present invention provides a three-dimensional printer device with a dust-escape prevention design.

The present invention provides a three-dimensional printer device for curing a powder material into shape. The three-dimensional printer device comprises a supplying apparatus, a formation table, a recycling trough, a distribution apparatus, a powder collection cover, and a control unit. The applying apparatus is used to contain the powder material. The formation table includes a horizontal surface, and one side of the horizontal surface is disposed adjacent to the supplying apparatus. The recycling trough includes an opening, and the opening is disposed at the other side of the horizontal surface opposite to the supplying apparatus. The distribution apparatus includes a roller, and the roller is movable across the horizontal surface between the supplying apparatus and the recycling trough so as to distribute the powder material in the supplying apparatus onto the horizontal surface to cover the same. The powder collection cover covers the roller. The control unit is electrically connected to the distribution apparatus and controls the roller to move between the supplying apparatus and the recycling trough. When the roller moves across the horizontal surface, the powder collection cover covers at least one portion of the horizontal surface.

The three-dimensional printer device of the present invention can further include a dust-escape prevention cover. The dust-escape prevention cover is pivotally disposed on the recycling trough and covers the opening. The three-dimensional printer device of the present invention can further include an inner block plate. The inner block plate is disposed in the recycling trough and moves in association with the dust-escape prevention cover. When the dust-escape prevention cover is opened away from the opening, the inner block plate covers below the opening of the recycling trough. The inner block plate can extend from the dust-escape prevention cover.

The powder collection cover forms a slope. When the powder collection cover moves to the recycling trough, the slope pushes the dust-escape prevention cover away from the opening.

A restoration assembly is disposed between the dust-escape prevention cover and the recycling trough, and the restoration assembly pushes the dust-escape prevention cover to cover the opening.

The roller is disposed on a sliding rail, and the sliding rail extends from the supplying apparatus to the opening. The roller is disposed perpendicular to the sliding rail.

The supplying apparatus includes a tank for containing the powder material, the tank includes a discharge hole, the discharge hole is at a level equal to or higher than the horizontal surface, an elevator is disposed on a bottom portion of the tank, and the elevator drives the bottom portion to move upwardly and downwardly to elevate and push the powder material out of the discharge hole.

The three-dimensional printer device of the present invention can further include a formation apparatus. The formation apparatus is movable across the horizontal surface. The formation apparatus can include an adhesive nozzle. The formation apparatus can include a light emitting element for radiating light to the horizontal surface. When the formation apparatus is disposed above the horizontal surface, the light emitting element is oriented toward the horizontal surface.

In the three-dimensional printer device of the present invention, the dust-escape prevention cover returns and covers the opening of the recycling trough, thereby preventing the powder material from escaping.

BRIEF DESCRIPTION OF THE DRAWINGS

The disclosure will become more fully understood from the detailed description, and the drawings given herein below is for illustration only, and thus does not limit the disclosure, wherein:

FIG. 9 is another schematic view illustrating the movement of the dust-escape prevention cover of the three-dimensional printer device according to the preferred embodiment of the present invention.

DETAILED DESCRIPTION OF THE INVENTION

Figure 1:
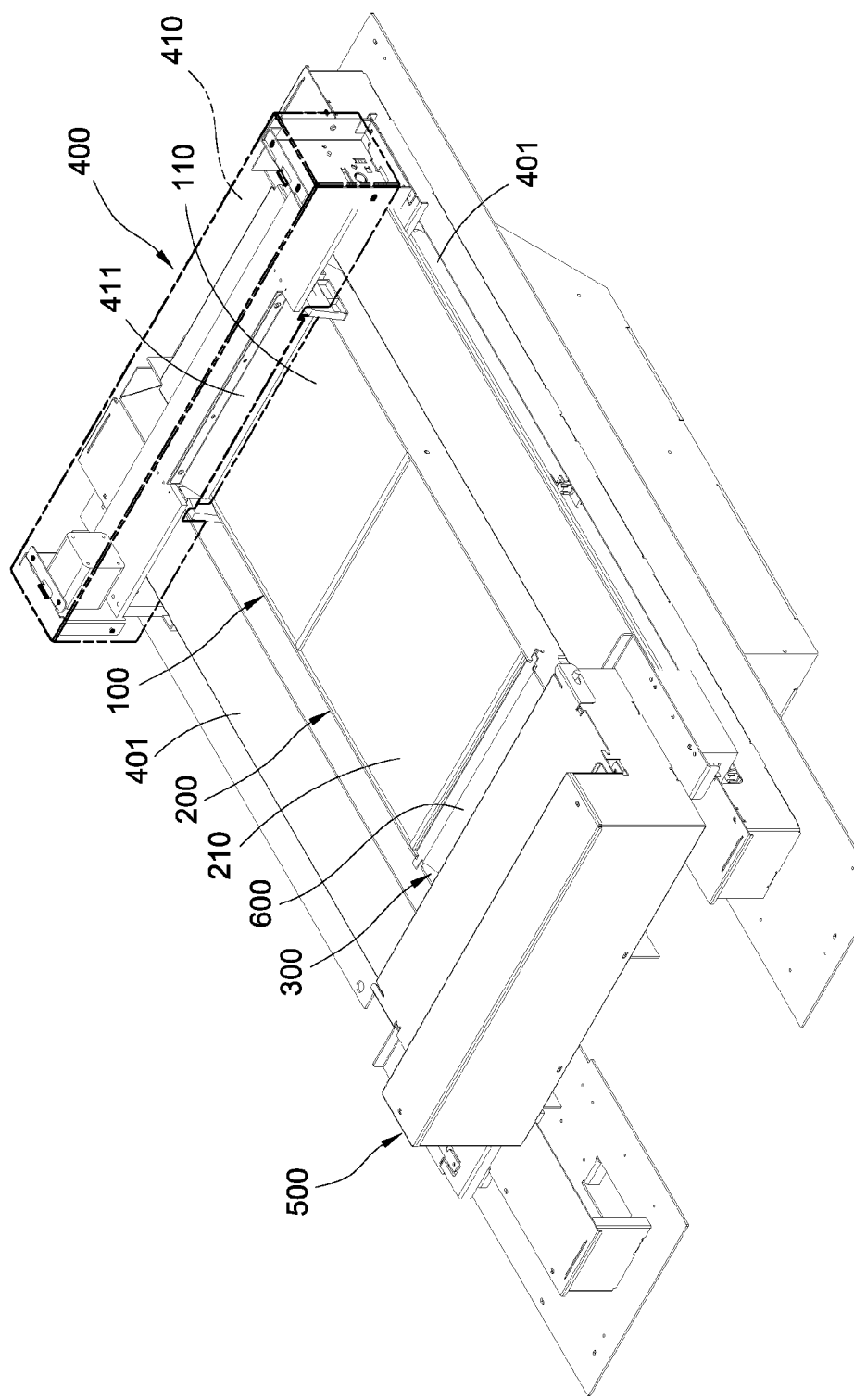
FIG. 1 is a perspective view illustrating a three-dimensional printer device according to one preferred embodiment of the present invention.
Figure 2:
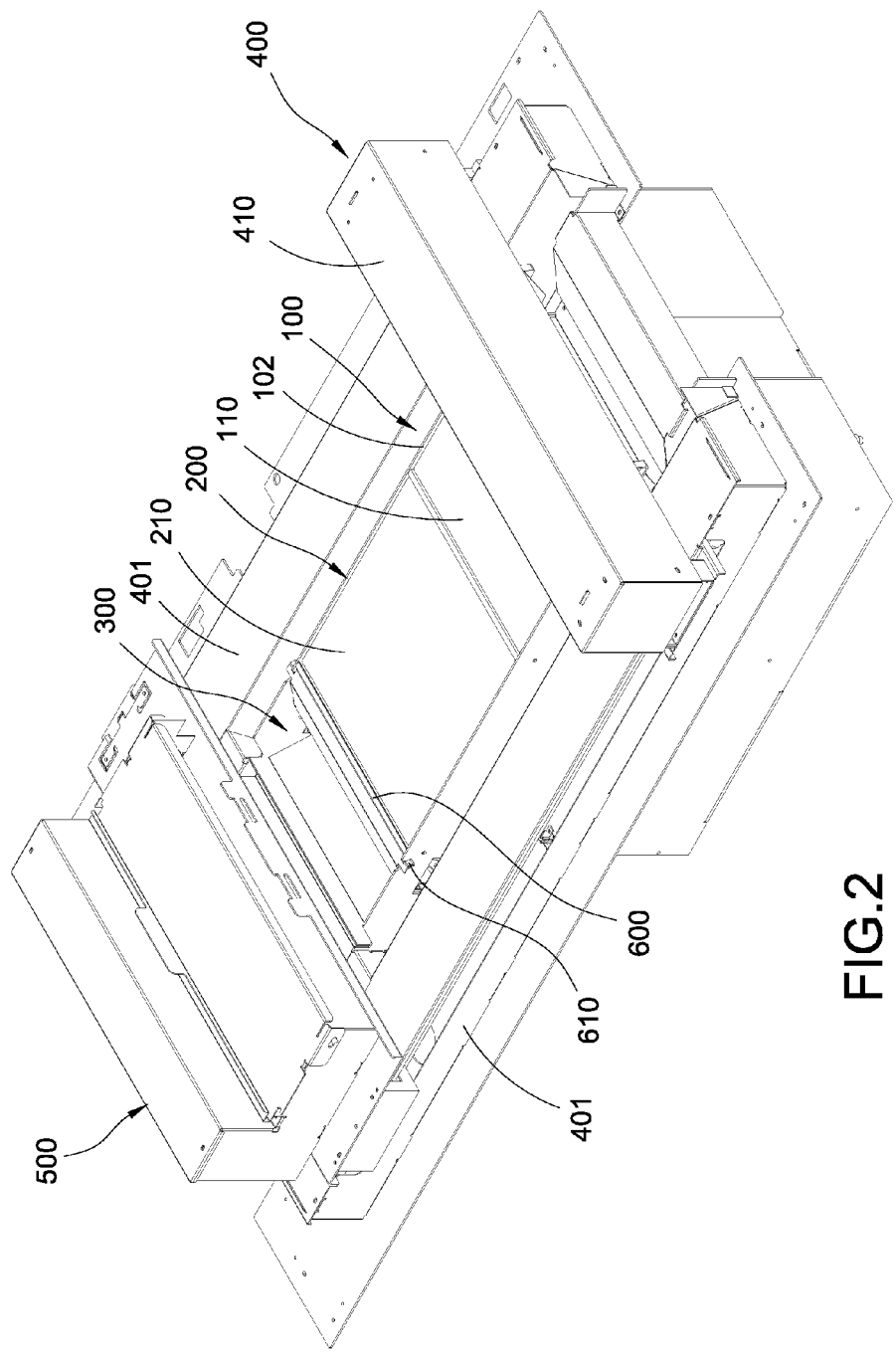
FIG. 2 is another perspective view illustrating the three-dimensional printer device according to the preferred embodiment of the present invention.

Referring to FIGS. 1 and 2, a three-dimensional printer device is provided according to a preferred embodiment of the present invention. The three-dimensional printer device is used for curing a powder material 11. In the present embodiment, the three-dimensional printer device comprises a supplying apparatus 100, a formation table 200, a recycling trough 300, a powder collection cover 410, a distribution apparatus 400, a formation apparatus, a control unit (not illustrated), and a dust-escape prevention cover 600.

Referring to FIGS. 1 to 4, in the present embodiment, the supply apparatus 100 includes a tank 101, the tank 101 has a discharge hole 102, the tank 101 is provided to accommodate a powder material 11, an elevator 120 is disposed on a bottom portion 110 of the tank 101, the elevator 120 drives the bottom portion 110 to move upwardly and downwardly, so as to elevate and push the powder material 11 out of the discharge hole 102.

The formation table 200 includes a horizontal surface 210, and one side of the horizontal surface 210 is disposed adjacent to the supplying apparatus 100. The discharge hole 102 of the supplying apparatus 100 is at a level equal to or higher than the horizontal surface 210. The recycling trough 300 includes an opening 301, and the opening 301 is disposed on the other side of the formation table 200 opposite to the supplying apparatus 100.

The distribution apparatus 400 includes at least one sliding rail 401 and a roller 420. The roller 420 is pivotally disposed inside the powder collection cover 410. The roller 420 is disposed on the sliding rail 401. In the present embodiment, it is preferable that the roller 420 is disposed on two sliding rails 401 parallel to each other, and the roller 420 is perpendicular to each sliding rail 401. Each sliding rail 401 extends from the supplying apparatus 100 to the opening 301 of the recycling trough 300. Accordingly, the roller 420 and the powder collection cover 410 together can move across the formation table 200 between the supplying apparatus 100 and the recycling trough 300. When the distribution apparatus 400 moves across the formation table 200, the powder collection cover 410 covers at least a portion of the horizontal surface 210.

When the roller 420 enters the formation table 200 from the supplying apparatus 100, the roller 420 is rotatable to push the powder material 11, at an outlet of the supplying apparatus 100, to the horizontal surface 210. When the roller 420 is going across the horizontal surface 210, the roller 420 is rotatable to distribute the powder material 11 pushed by the roller 420, so the powder material 11 can cover the horizontal surface 210 with the same thickness.

Figure 3:
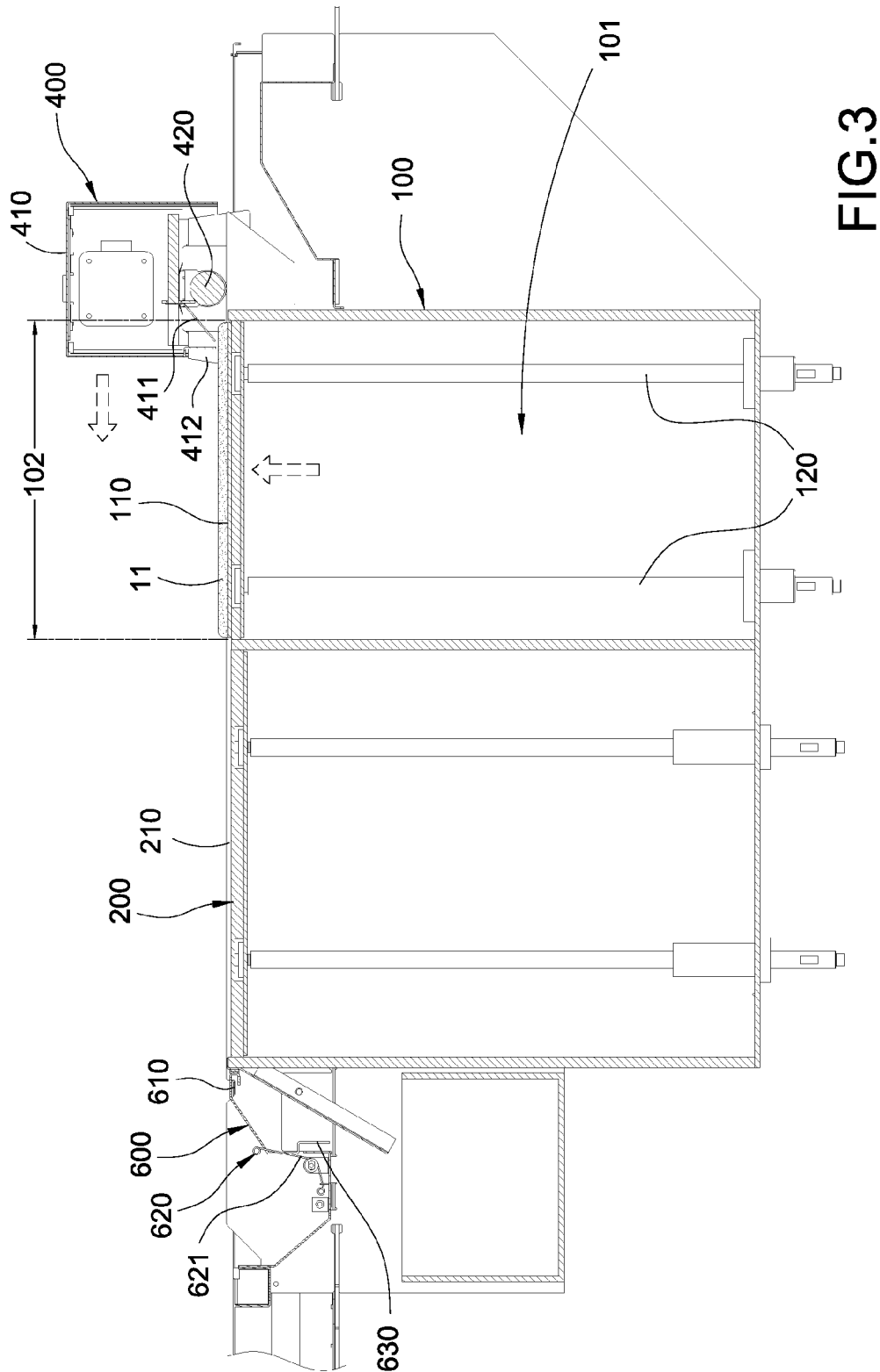
FIG. 3 is a schematic view illustrating movement of the three-dimensional printer device according to the preferred embodiment of the present invention.
Figure 4:
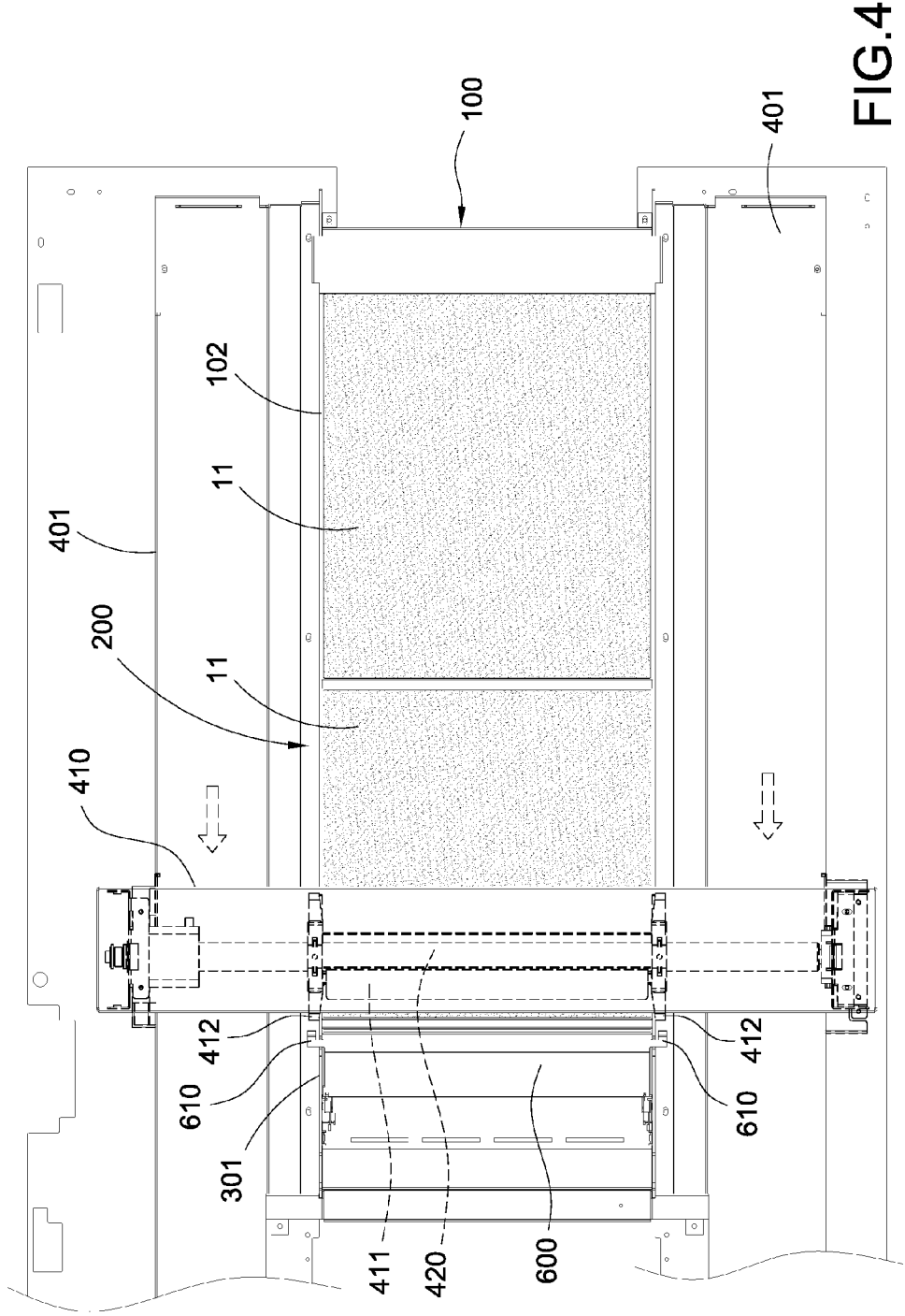
FIG. 4 is another schematic view illustrating the movement of the three-dimensional printer device according to the preferred embodiment of the present invention.

Referring to FIGS. 1 to 3, the formation apparatus 500 is movable across the horizontal surface 210. The formation apparatus 500 can include an adhesive nozzle (not illustrated); an adhesive solution is ejected from the adhesive nozzle to cover the powder material 11 on the horizontal surface 210, thereby curing the powder material 11. The formation apparatus 500 can also include a light emitting element (not illustrated) for radiating light to the horizontal surface 210. The light emitting element is preferably an ultraviolet light emitting element. When the formation apparatus 500 is disposed above the horizontal surface 210, the light emitting element radiates light toward the horizontal surface 210, so that the powder material 11 covering the horizontal surface 210 receives radiation of light and cures.

The control unit is electrically connected to the supplying apparatus 100, the distribution apparatus 400 and the formation apparatus 500. By means of the control unit, the following steps are performed in sequence: driving the supplying apparatus 100 to provide the powder material 11, driving the distribution apparatus 400 to distribute the powder material 11 to cover the horizontal surface 210, and driving the formation apparatus 500 to cure the powder material 11 on the horizontal surface 210.

A baffle 411 is disposed in the powder collection cover 410, and the baffle 411 covers the roller 420 and is disposed inclinedly over the roller 420. After distribution is completed, the remaining powder material 12 is pushed to the baffle 411 to be collected inside the powder collection cover 410, thereby preventing the powder material 12 from escaping and attached to the formation apparatus 500 to affect formation.

Referring to FIGS. 1 to 4, the powder collection cover 410 forms at least one slope 412. In the present embodiment, the powder collection cover 410 preferably forms two slopes 412 parallel to each other at two ends with respect to the roller 420, a lower edge of each slope 412 is where the slope 412 is closest to the recycling trough 300, and the lower edge of each slope 412 is closer to the opening 301 of the recycling trough 300 than the powder collection cover 410.

Figure 5:
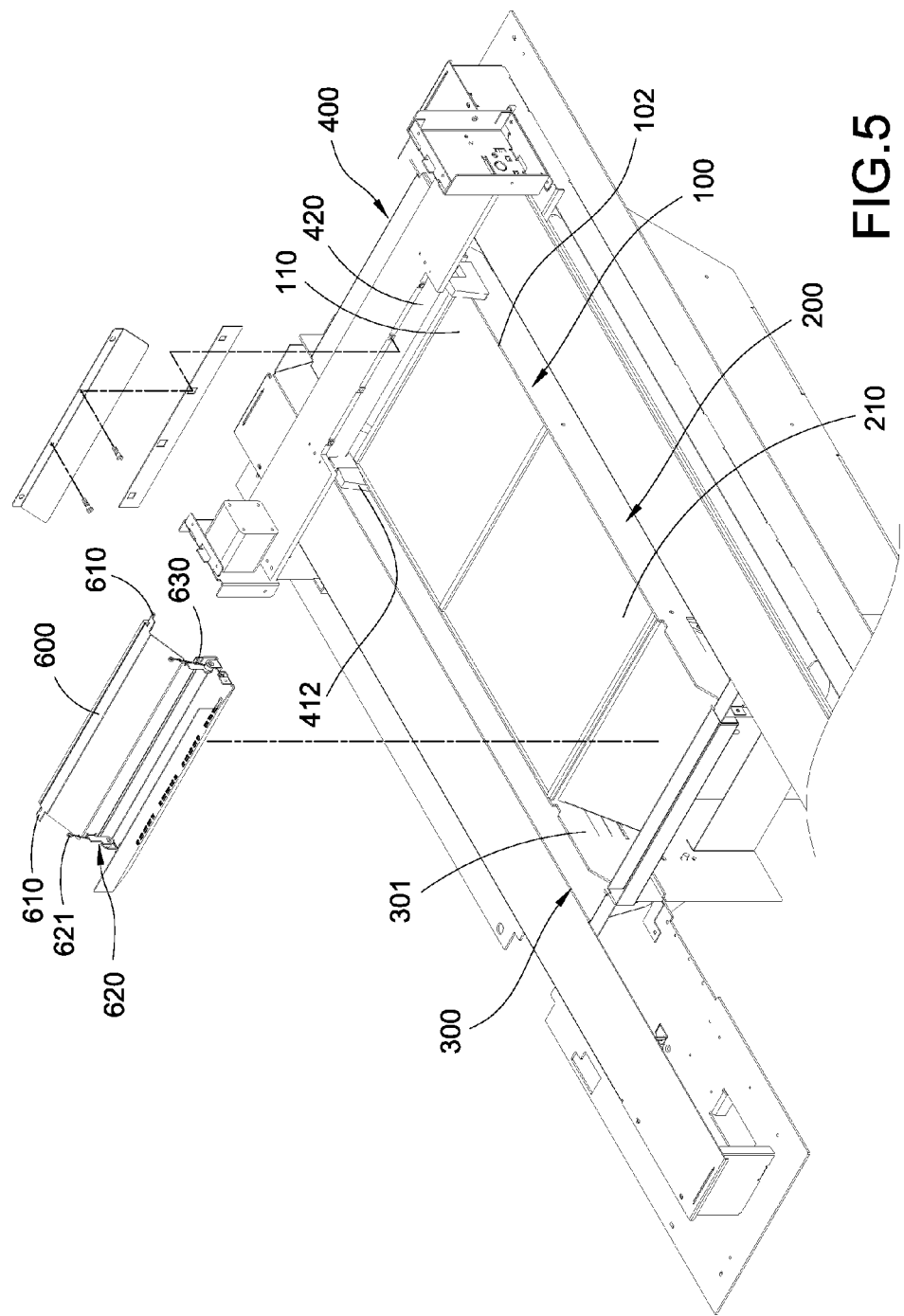
FIG. 5 is a perspective exploded view illustrating the three-dimensional printer device according to the preferred embodiment of the present invention.
Figure 6:
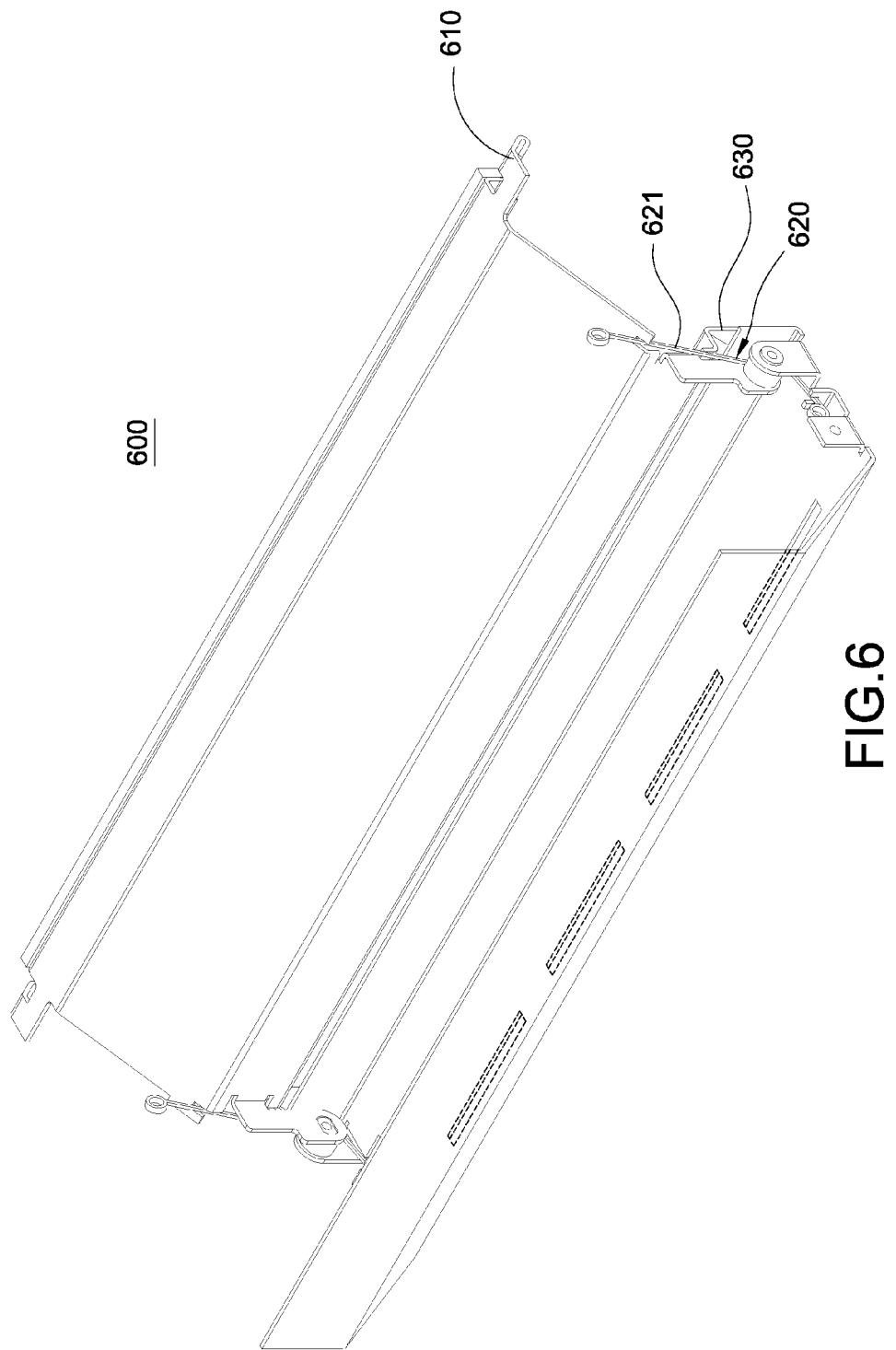
FIG. 6 is a schematic view illustrating a dust-escape prevention cover of the three-dimensional printer device according to the preferred embodiment of the present invention.
Figure 7:
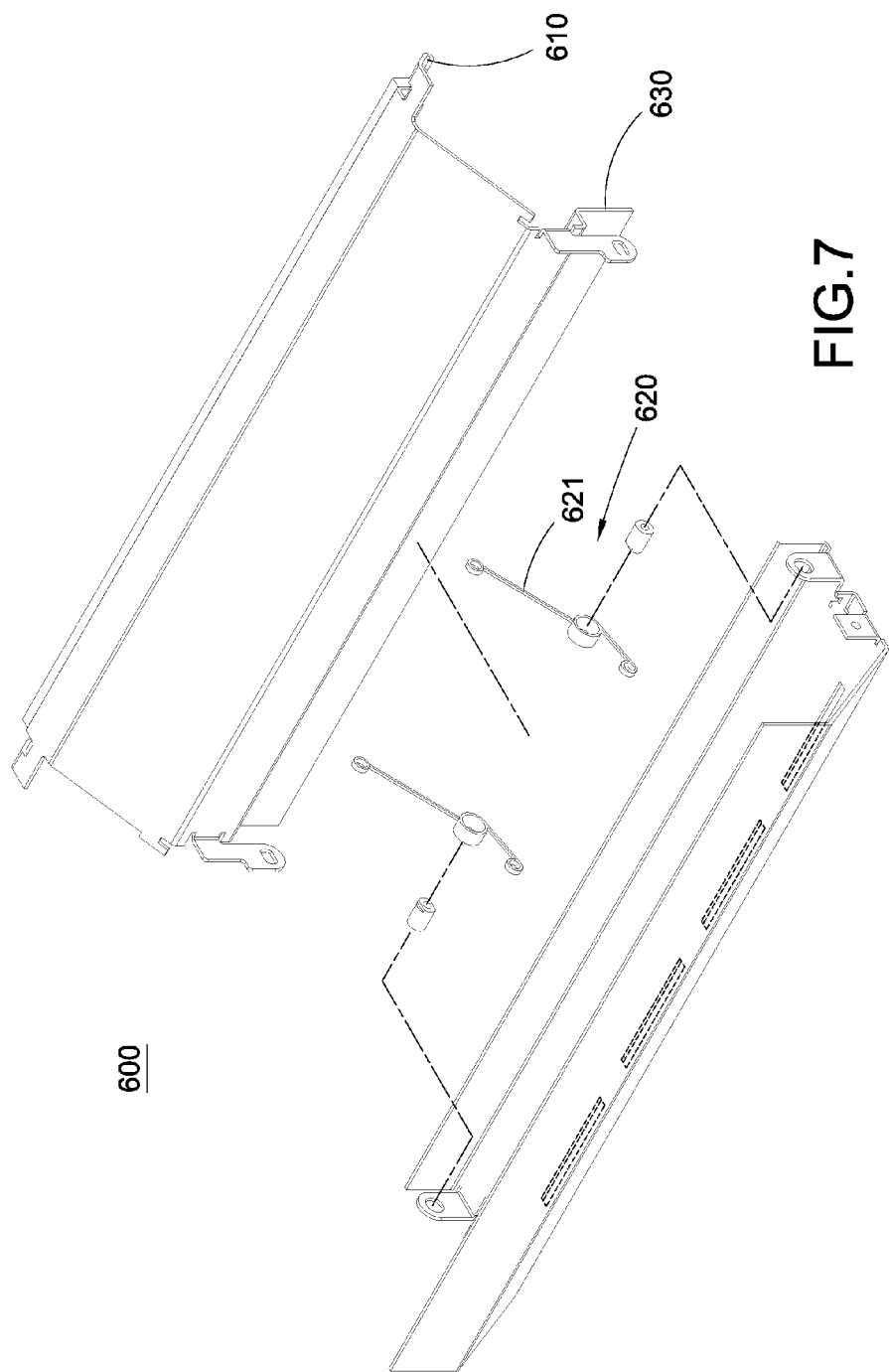
FIG. 7 is another schematic view illustrating the dust-escape prevention cover of the three-dimensional printer device according to the preferred embodiment of the present invention.

Referring to FIGS. 5 to 7, the dust-escape prevention cover 600 is pivotally disposed on the recycling trough 300 and covers the opening 301 of the recycling trough 300, and the dust-escape prevention cover 600 preferably extends to form two protrusions 610 corresponding to the slope 412 of the powder collection cover 410.

Figure 8:
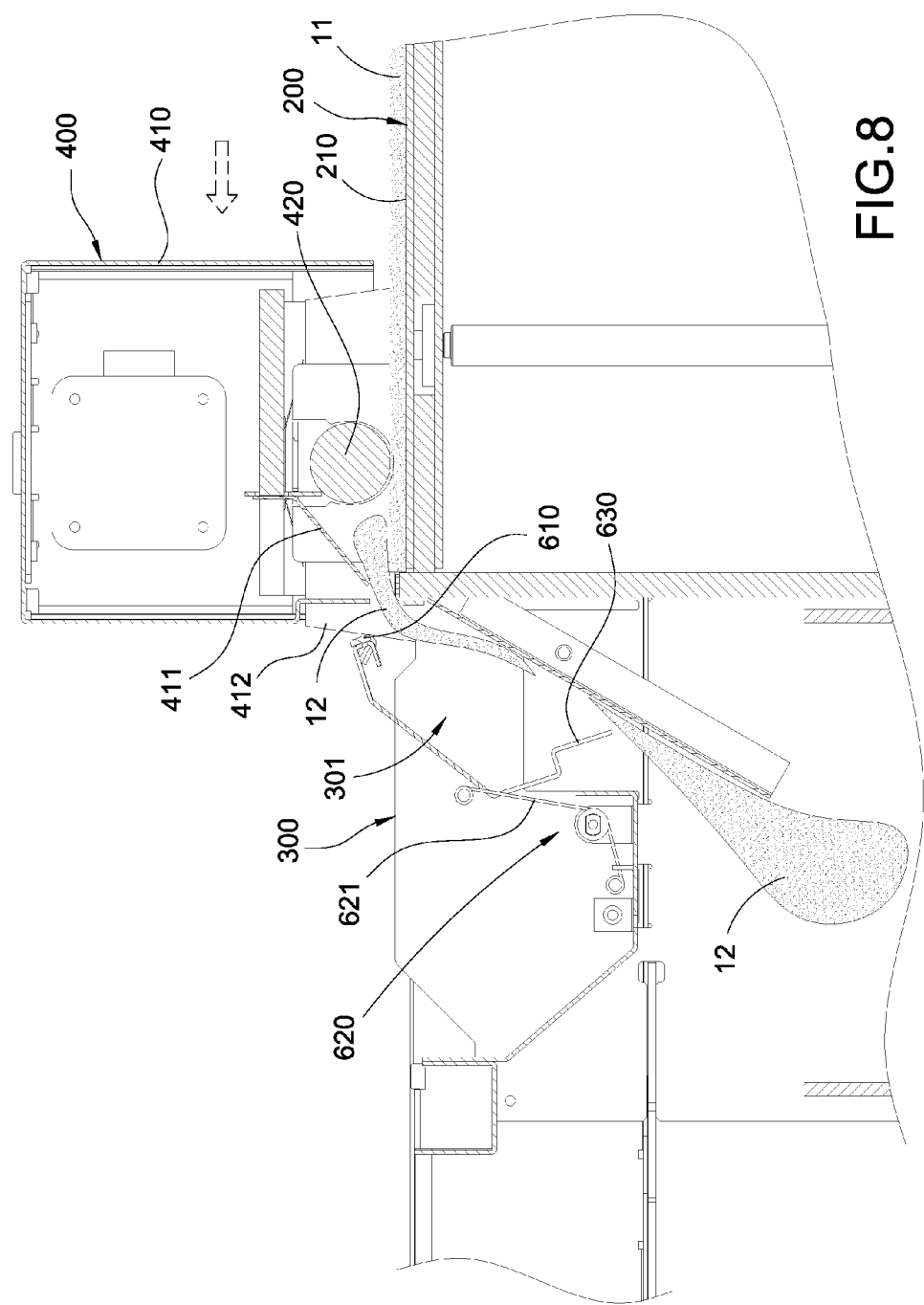
FIG. 8 is a schematic view illustrating movement of the dust-escape prevention cover of the three-dimensional printer device according to the preferred embodiment of the present invention.

Referring to FIGS. 8 and 9, when the powder collection cover 410 moves to be in front of the recycling trough 300, each slope 412 can correspondingly push each of the protrusions 610 on the dust-escape prevention cover 600 to thereby push the dust-escape prevention cover 600 away from the opening 301. When the powder collection cover 410 moves to be above the recycling trough 300, the remaining powder material 12 inside the powder collection cover 410 drops into the recycling trough 300 through the opening 301. When the powder collection cover 410 leaves the recycling trough 300, the dust-escape prevention cover 600 returns and covers the opening 301, thereby preventing the powder material 12 from escaping and attached to the formation apparatus 500 to affect formation during the process that the powder material 12 drops into the recycling trough 300. A restoration assembly 620 is disposed between the dust-escape prevention cover 600 and the recycling trough 300, the restoration assembly 620 can push the dust-escape prevention cover 600 to return and cover the opening 301. In the present embodiment, the restoration assembly 620 is preferably a spring 621, and two ends of the spring 621 are connected to the recycling trough 300 and the dust-escape prevention cover 600 respectively, so that the spring 621 can provide a force for making the dust-escape prevention cover 600 return; however, the present invention is not limited in this regard.

The three-dimensional printer device of the present invention can selectively include an inner block plate 630. In the present invention, the inner block plate 630 preferably extends from the dust-escape prevention cover 600. The inner block plate 630 is disposed in the recycling trough 300 and moves in association with the dust-escape prevention cover 600. When the dust-escape prevention cover 600 is opened away from the opening 301, the inner block plate 630 covers below the opening 301 of the recycling trough 300, thereby preventing the powder material 12 in the recycling trough 300 from escaping and attached to the formation apparatus 500 to affect formation.

It is to be understood that the above descriptions are merely the preferable embodiment of the present invention and are not intended to limit the scope of the present invention. Equivalent changes and modifications made in the spirit of the present invention are regarded as falling within the scope of the present invention.

What is claimed is:

1. A three-dimensional printer device, comprising:
   a supplying apparatus;
   a formation table including a horizontal surface, one side of the horizontal surface being disposed adjacent to the supplying apparatus;
   a recycling trough, the recycling trough including an opening, the opening being disposed at the other side of the horizontal surface opposite to the supplying apparatus;
   a dust-escape prevention cover disposed on the recycling trough and covering the opening to close the opening;
   a distribution apparatus, the distribution apparatus including a roller, the roller being movable across the horizontal surface between the supplying apparatus and the recycling trough;
   a powder collection cover covering the roller; and
   a control unit electrically connected to the distribution apparatus and controlling the roller to move between the supplying apparatus and the recycling trough, wherein when the roller moves across the horizontal surface, the powder collection cover covers at least one portion of the horizontal surface,
   wherein when the powder collection cover moves close to the recycling trough, the powder collection cover moves to push the dust-escape prevention cover away from the opening; wherein when the powder collection cover moves away from the recycling trough, the powder collection cover and the dust-escape prevention cover are separated from each other.

2. The three-dimensional printer device of claim 1, further comprising an inner block plate disposed in the recycling trough and moving in association with the dust-escape prevention cover, when the dust-escape prevention cover is opened away from the opening, the inner block plate covers below the opening of the recycling trough.

3. The three-dimensional printer device of claim 2, wherein the inner block plate extends from the dust-escape prevention cover.

4. The three-dimensional printer device of claim 1, wherein a restoration assembly is disposed between the dust-escape prevention cover and the recycling trough, and the restoration assembly pushes the dust-escape prevention cover to cover the opening.

5. The three-dimensional printer device of claim 1, wherein the roller is disposed on a sliding rail, and the sliding rail extends from the supplying apparatus to the opening.

6. The three-dimensional printer device of claim 5, wherein the roller disposed perpendicular to the sliding rail.

7. The three-dimensional printer device of claim 1, further comprising a formation apparatus, the formation apparatus being movable across the horizontal surface.

8. The three-dimensional printer device of claim 7, wherein the formation apparatus includes an adhesive nozzle.

9. The three-dimensional printer device of claim 7, wherein the formation apparatus includes a light-emitting element for radiating light to the horizontal surface, and when the formation apparatus is disposed above the horizontal surface, the light-emitting element is oriented toward the horizontal surface.

10. A three-dimensional printer device, comprising:
    a supplying apparatus;
    a formation table including a horizontal surface, one side of the horizontal surface being disposed adjacent to the supplying apparatus;
    a recycling trough, the recycling trough including an opening, the opening being disposed at the other side of the horizontal surface opposite to the supplying apparatus;
    a distribution apparatus, the distribution apparatus including a roller, the roller being movable across the horizontal surface between the supplying apparatus and the recycling trough;
    a dust-escape prevention cover disposed on the recycling trough and covering the opening;
    a powder collection cover covering the roller; and
    a control unit electrically connected to the distribution apparatus and controlling the roller to move between the supplying apparatus and the recycling trough, wherein when the roller moves across the horizontal surface, the powder collection cover covers at least one portion of the horizontal surface,
    wherein the powder collection cover forms a slope, and when the powder collection cover moves to the recycling trough, the slope pushes the dust-escape prevention cover away from the opening.

11. The three-dimensional printer device of claim 10, further comprising an inner block plate disposed in the recycling trough and moving in association with the dust-escape prevention cover, when the dust-escape prevention cover is opened away from the opening, the inner block plate covers below the opening of the recycling trough.

12. The three-dimensional printer device of claim 11, wherein the inner block plate extends from the dust-escape prevention cover.

13. The three-dimensional printer device of claim 10, wherein a restoration assembly is disposed between the dust-escape prevention cover and the recycling trough, and the restoration assembly pushes the dust-escape prevention cover to cover the opening.

14. The three-dimensional printer device of claim 10, wherein the roller is disposed on a sliding rail, and the sliding rail extends from the supplying apparatus to the opening.

15. The three-dimensional printer device of claim 14, wherein the roller is disposed perpendicular to the sliding rail.

16. The three-dimensional printer device of claim 10, further comprising a formation apparatus, the formation apparatus being movable across the horizontal surface.

17. The three-dimensional printer device of claim 16, wherein the formation apparatus includes an adhesive nozzle.

18. The three-dimensional printer device of claim 16, wherein the formation apparatus includes a light-emitting element for radiating light to the horizontal surface, and when the formation apparatus is disposed above the horizontal surface, the light-emitting element is oriented toward the horizontal surface.

19. The three-dimensional printer device of claim 10, wherein the supplying apparatus includes a tank, the tank includes a discharge hole, the discharge hole is at a level equal to or higher than the horizontal surface, an elevator is disposed on a bottom portion in the tank, and the elevator drives the bottom portion to move upwardly and downwardly.

\* \* \* \* \*